United States Patent [19]
Ijaz

[11] Patent Number: 5,948,298
[45] Date of Patent: *Sep. 7, 1999

[54] BATTERY HEATING SYSTEM

[75] Inventor: Mujeeb Ismael Ijaz, Ypsilanti, Mich.

[73] Assignee: Ford Global Technologies, Inc., Dearborn, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/638,083

[22] Filed: Apr. 26, 1996

[51] Int. Cl.$^6$ .............................. H05B 1/00; B60R 16/04
[52] U.S. Cl. .......................................... 219/209; 180/68.5
[58] Field of Search ...................................... 219/200, 202, 219/209, 483, 486; 429/97, 99, 100, 120, 123; 180/68.5

[56] References Cited

U.S. PATENT DOCUMENTS

| | | |
|---|---|---|
| 3,350,777 | 11/1967 | Mendelsohn . |
| 3,623,916 | 11/1971 | Toyooka et al. . |
| 4,171,508 | 10/1979 | Sinclair . |
| 4,562,338 | 12/1985 | Okami ..................................... 219/483 |
| 4,591,692 | 5/1986 | Wightman . |
| 4,633,067 | 12/1986 | Payne et al. ............................ 219/483 |
| 4,733,057 | 3/1988 | Stanzel et al. . |
| 4,990,752 | 2/1991 | Worrall et al. .......................... 219/483 |
| 5,039,927 | 8/1991 | Centrafanti . |
| 5,055,656 | 10/1991 | Farah et al. . |
| 5,120,936 | 6/1992 | Shyu et al. .............................. 219/483 |
| 5,131,812 | 7/1992 | Boyd et al. . |
| 5,140,812 | 8/1992 | Cornelison et al. . |
| 5,262,618 | 11/1993 | Thelen .................................... 219/483 |
| 5,281,792 | 1/1994 | Lee et al. . |
| 5,362,942 | 11/1994 | Vanderslice, Jr. et al. . |
| 5,378,555 | 1/1995 | Waters et al. . |
| 5,422,462 | 6/1995 | Kishimoto . |

FOREIGN PATENT DOCUMENTS

| | | |
|---|---|---|
| 153046 | 9/1953 | Australia . |
| 2812879 | 10/1976 | Germany . |

*Primary Examiner*—Teresa Walberg
*Assistant Examiner*—Sam Paik
*Attorney, Agent, or Firm*—Mark S. Sparschu

[57] ABSTRACT

A battery heating system for the batteries of an electrical vehicle includes a plurality of electrical heaters. The electrical heaters are apportioned into a plurality of groups, the groups coupled to independently-switchable voltage sources. One or more of the electrical heaters may have a parallel/series design for their resistive heater elements, to improve the reliability of those heaters.

4 Claims, 7 Drawing Sheets

BATTERY HEATING SYSTEM

BACKGROUND OF THE INVENTION

1. Field of the Invention

The present system relates to heating systems for motor vehicle batteries.

2. Description of the Related Art

In an electrically-propelled vehicle, one of the foremost challenges is to maximize the energy available from the on-board batteries to drive the electric motor or motors which propel the vehicle. Typically, many batteries will be connected in series, at a voltage of several hundred volts, to provide that energy.

In order to store and extract a reasonable amount of energy from the batteries, batteries of most technologies should be kept above a predetermined minimum temperature while being charged and discharged. Thus, in ambient temperatures below the predetermined minimum, the batteries should be heated. Further, in order to best balance the state of charge of the batteries when being charged and when being discharged, the temperatures of the batteries should be kept as close as reasonably possible to one another. A warmer battery will have greater capacity to accept and deliver energy than a cooler battery. But, an important fact to consider is that once one of the batteries is discharged, energy should no longer be taken from any of the batteries. Thus, the range of the vehicle is limited by whichever battery is least able to deliver energy. Since ability of the batteries to store and to deliver energy is related to temperature, the temperatures of batteries should be maintained as reasonably uniform as possible.

In one known system for heating the batteries of an electric vehicle, an individual electric heater is provided to heat each battery. The electric heaters are coupled together in series across the series connection of the vehicle's batteries. Although such a system may be generally effective, it has a disadvantage of having many high-voltage connections among the heaters. Those skilled in the art will recognize that the high-voltage connections may tend to find leakage paths to chassis ground. This is disadvantageous, in that electric vehicles are often designed to have the high voltage of the series connection of batteries isolated from chassis ground.

Electric vehicles often are also designed with a lower-voltage system which is referenced to chassis ground. This system powers the "conventional" electrical accessories of the vehicle (lamps, radio, and the like). One way of generating such lower voltage is via a DC-to-DC converter which converts the high voltage of the series connection of batteries to the lower voltage. While one may look to the lower-voltage system in order to power the heaters for the batteries, energy in the lower-voltage system is fairly scarce, due to the limitation of the DC-to-DC converter to generate the energy. Adding too many heaters to the low-voltage system can thus exceed the capability of the DC-to-DC converter to supply power to all of the loads connected to the low-voltage system.

Another challenge in the design of a heating system for electric vehicle batteries is in uniformly heating the batteries. Where there is a large number of batteries, which is fairly typical in order to provide the vehicle with the highest practical energy storage capacity, the batteries must be packaged into whatever space is available in the vehicle. This can result is the batteries being packaged in an irregular geometry. Such an irregular geometry may be difficult to uniformly heat. Further, the carrier in which the batteries may be located may have non-uniform heat loss characteristics in various areas. Such non-uniform heat loss characteristics can be due to wiring pass-throughs in the walls of the battery carrier as well as non-uniform insulation thicknesses in the walls of the battery carrier. The packaging space available in the vehicle for the battery carrier may necessitate such varying thicknesses of insulation in the walls of the battery carrier. The non-uniform heat loss may further be due to hydrogen-ventilation provisions in the battery carrier. For all of the above reasons, uniform heating of the batteries of the electric vehicle can be a challenge. It is even a greater challenge if no system is provided to circulate air within the battery carrier in order to help promote a uniform temperature within the battery carrier. Avoiding the use of such an air-circulation system can provide considerable cost advantages.

Thus, a battery heating system for an electric vehicle which can minimize high-voltage connections, which can avoid placing excessive demands on the lowervoltage system and which can assure uniform temperatures of the batteries without the need for an air circulation system will provide advantages over the prior art.

SUMMARY OF THE INVENTION

The present invention provides a heating system for a plurality of vehicle batteries. The system comprises a series-connected plurality of vehicle batteries. The system additionally includes a plurality of electric heaters apportioned into at least a first group containing at least one electric heater and a second group containing at least one electric heater, each electric heater of the plurality of electric heaters in thermal communication with at least one of the vehicle batteries. Further, the system comprises a DC-to-DC voltage downconverter having an input coupled to the series-connected plurality of vehicle batteries and having an output. The first group of electric heaters is coupled to receive electric power at the series voltage of the series-connected plurality of vehicle batteries, and the second group of electric heaters is coupled to receive electric power from the output of the voltage downconverter.

Battery heating systems according to some embodiments of the present invention can avoid an excess of high-voltage connections and can also avoid excessive drain on the low-voltage portion of an electric vehicle's electrical system. Further, uniform heating can be provided without the need for an air-circulation system. For all of these reasons, battery heating systems according to the present invention can provide advantages over alternative battery heating systems.

DETAILED DESCRIPTION OF THE PREFERRED EMBODIMENT

Figure 1:
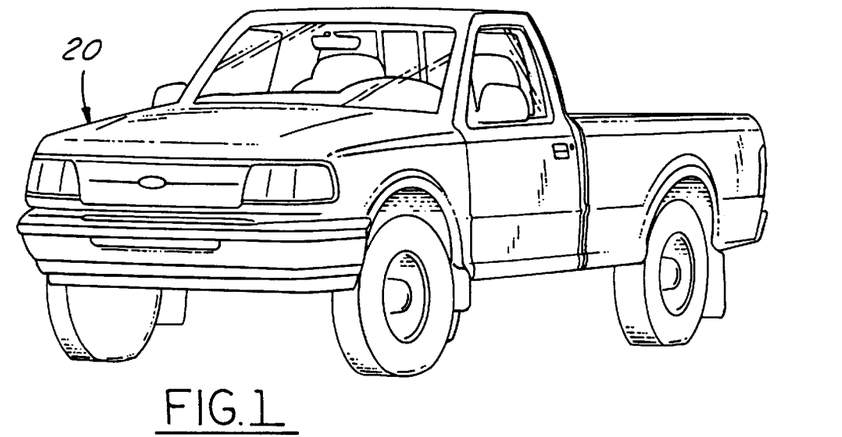
FIG. 1 is a perspective view of an electrically-propelled vehicle 20.

Refer first to FIG. 1. One application for the present invention is in electrically-propelled vehicles such as electrically-propelled vehicle 20. In such a vehicle, power for propulsion of vehicle 20 is provided by a plurality of batteries which are carried on board the vehicle. The batteries provide power to drive one or more motors coupled to the drive wheels of vehicle 20.

Figure 2:
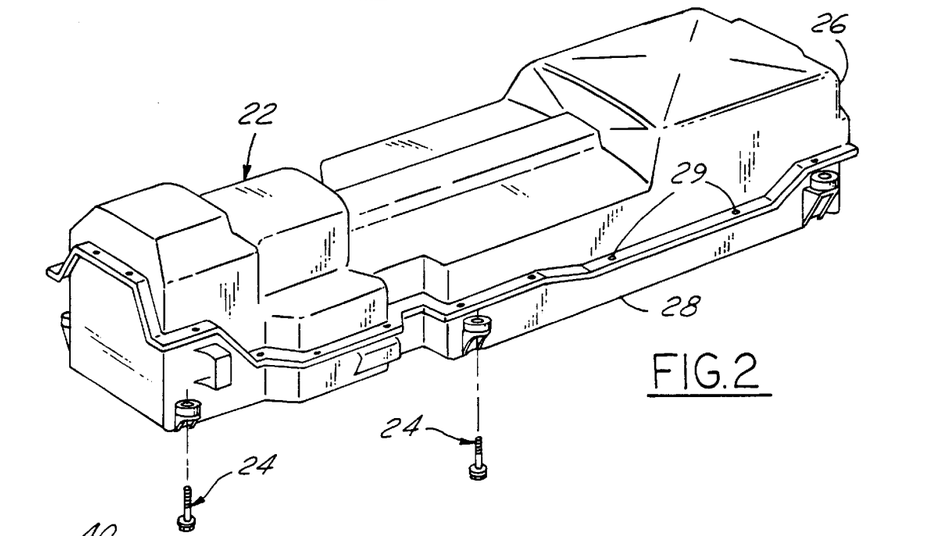
FIG. 2 is a perspective view of a battery carrier 22 which contains the batteries for electrically-propelled vehicle 20.

Refer now additionally to FIG. 2. Batteries for propulsion of vehicle 20 can be carried in a battery carrier 22. Battery carrier 22 is designed to mount to the frame of vehicle 20, on the longitudinal center line of the vehicle and spanning the distance between the front wheels and rear wheels of the vehicle. Battery carrier 22 is mounted to the frame of vehicle 20 by a plurality of bolts such as bolts 24. Battery carrier 22 includes an upper portion 26 and a lower portion 28. These portions are coupled via fasteners in holes 29 spaced along complementary flanges of upper portion 26 and lower portion 28.

Figure 3:
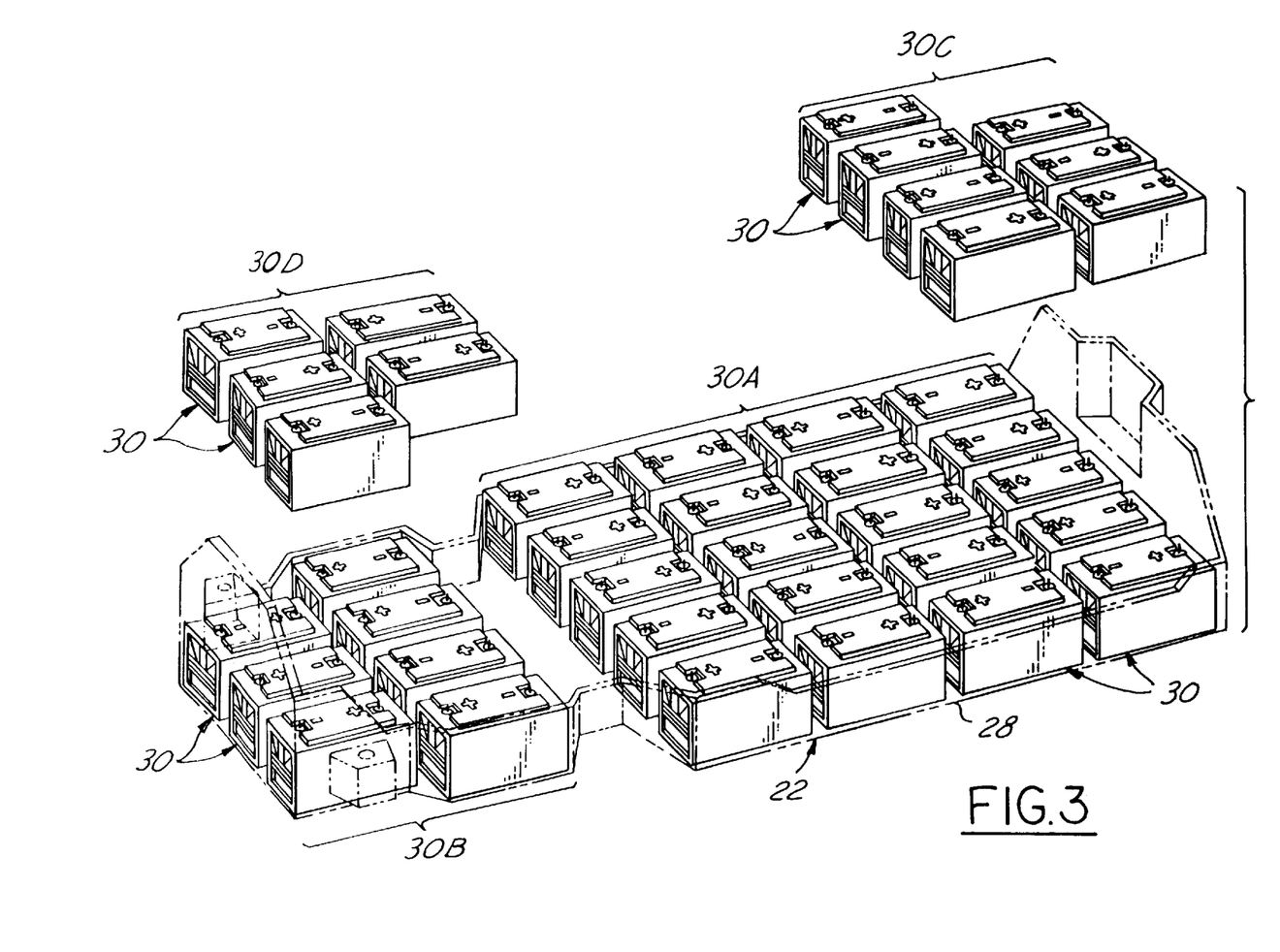
FIG. 3 shows the locations of batteries 30 within battery carrier 22.

Referring additionally to FIG. 3, upper portion 26 is omitted from battery carrier 22 and lower portion 28 is shown in phantom, so the placement of the batteries 30 in battery carrier 22 can be seen. Batteries 30 are grouped in four groups. The first group 30A of batteries 30 is located at the bottom of and rearward in battery carrier 22. A second group 30B of batteries 30 is located at the bottom of and forward in battery carrier 22. A third group 30C of batteries 30 is located in a second tier atop some of the batteries 30 of group 30A. A fourth group 30D of batteries 30 is located in a second tier atop some of the batteries 30 of group 30B. As one skilled in the art will appreciate, the exact placement of such a large number of batteries (in this case 39 batteries) in a vehicle strongly depends upon the geometry of the vehicle.

Figure 4:
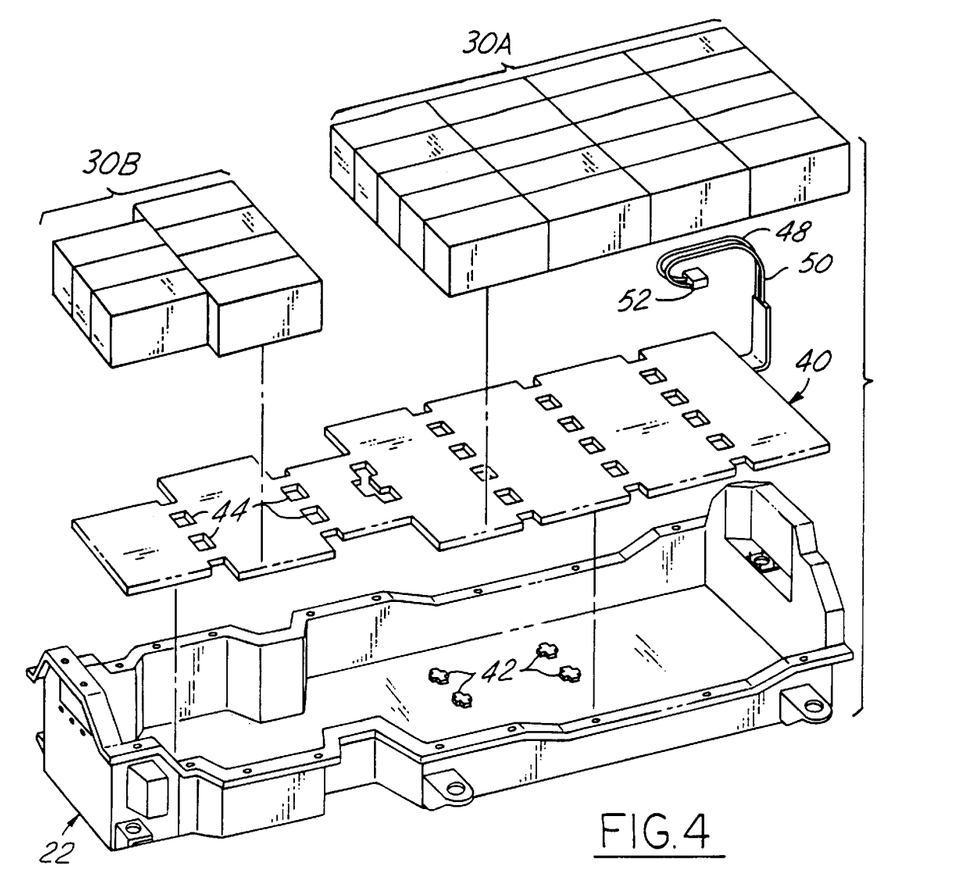
FIG. 4 shows the placement of an electric heater 40 and some of batteries 30 into battery carrier 22.

Refer now additionally to FIG. 4. An electric heater 40 is placed in the bottom of battery carrier 22. A number of locators molded into the bottom of lower portion 28 of battery carrier 22, such as cross-shaped locators 42, help to locate heater element 40. The number of locators is equal to the number of openings 44 in heater element 40. Each opening 44 in heater element 40 is placed over one locator.

Figure 4A:
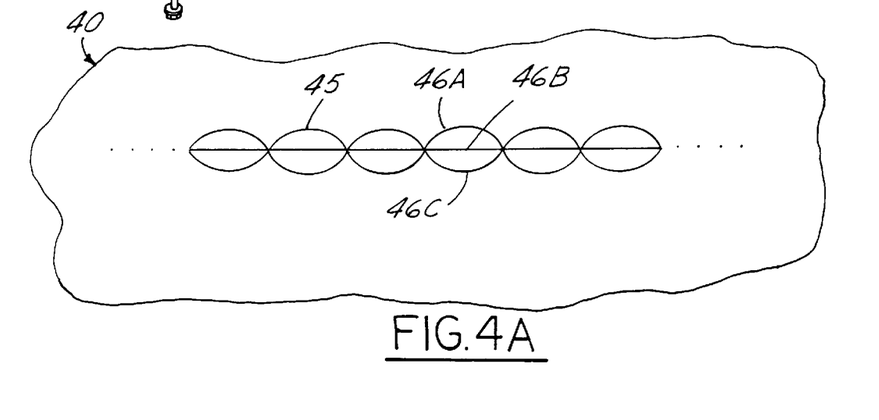
FIG. 4A shows detail of the heater element 45 of electric heater 40.

The construction of heater 40 is described with reference to FIG. 4A. Heater 40 is comprised of an electrically-insulating and preferably flexible substrate such as neoprene on which is disposed a heater element 45. Heater element 45 can be formed, for example, of resistive foil which is etched into the configuration shown. Heater element 45 can also be comprised of very thin wire disposed and connected in the configuration shown.

Heater element 45 comprises groups of parallel-connected segments such as the group comprising segments 46A, 46B and 46C. All of the groups of parallel-connected segments are coupled in series between the two wires 48 and 50 which exit from heater 40 and terminate in connector 52. Each segment (such as segment 46A), is an electrical conductor with a finite resistance. Heater element 45 is designed such that the series connection of parallel-connected segments has a known resistance which will provide sufficient heating capacity when heater 40 is energized.

The parallel-connected segments which are connected with one another in series provide a substantial reliability improvement over a heater element merely having a single resistive wire or trace running from wire 48 to wire 50. If any one of the parallel-connected segments in a group (for example, segment 46A) becomes open-circuited due to breakage, the other parallel-connected segments in that group (for example, segments 46B and 46C) will still be able to carry current between wires 48 and 50. Thus, breakage of segment 46A will not cause failure of heater 40. Such a single break would cause failure of a heater comprising a single wire or trace between wires 48 and 50.

Breakage of one segment (for example, segment 46A) of heater element 45 will, however, cause a reduction in heating capability of heater 40. But, with judicious design this reduction in heating ability can be kept within reasonable limits. For example, it has been shown that a heater element 45 with 200 series-connected groups of three parallel-connected segments, all such segments having the same resistance, can sustain the opening of five individual segments (such as segment 46A) before the resistance of heater element 45 increases by 1%. As heating capacity is inversely proportional to resistance, it is alternatively concluded that five segments can fail before the heating capacity of heater 40 is reduced by 1%.

Depending upon the specific heating requirements of batteries 30, the segments (such as segments 46A, 46B and 46C) can be selected to have the same resistance throughout heater 40 or can be different resistances in different areas. As has been discussed the specific heating requirements can be functions of, for example, the geometry in which batteries 30 are packaged and the heat loss characteristics of battery carrier 22.

Refer again to FIG. 4. Once heater 40 has been placed into battery carrier 22, the batteries 30 in groups 30A and 30B are placed on top of heater 40 in the bottom of battery carrier 22. The batteries 30 in battery groups 30A and 30B are located by the cross-shaped locators such as locators 42.

Figure 5:
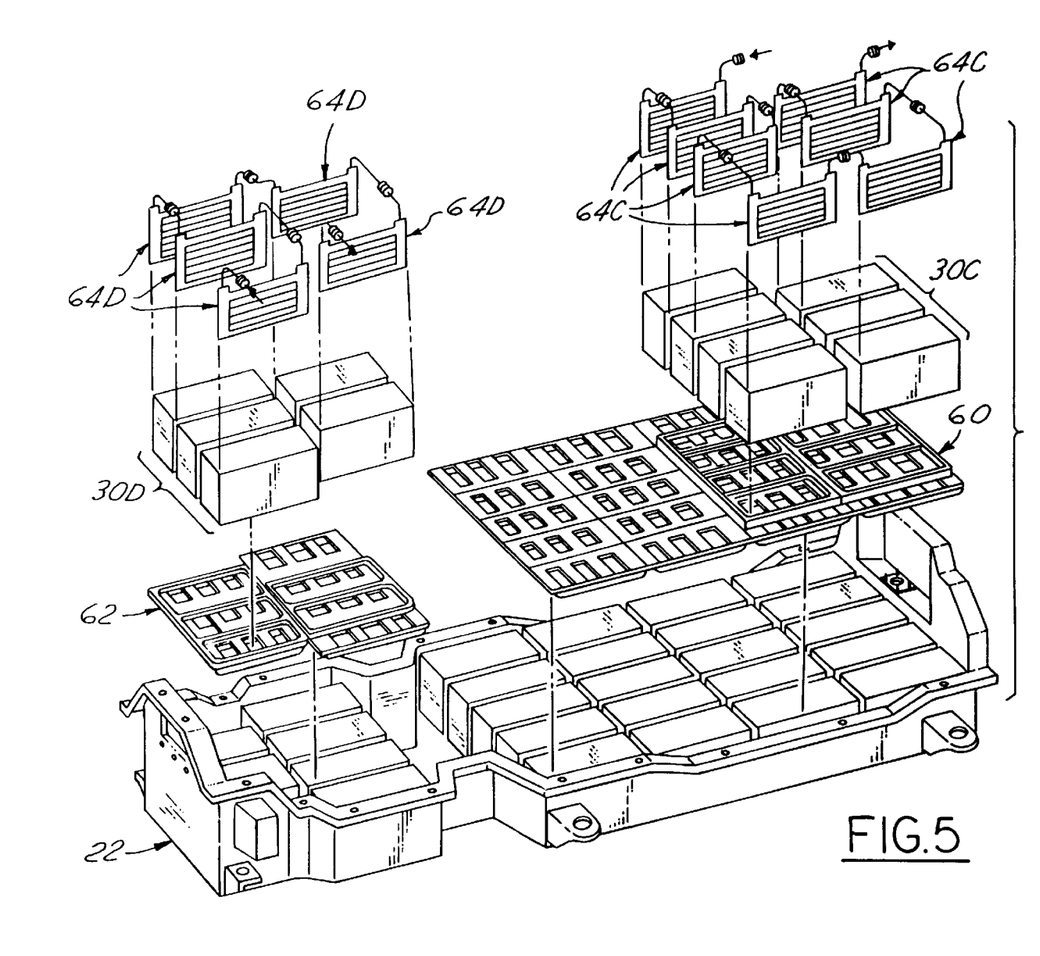
FIG. 5 shows the placement of more batteries 30 in battery carrier 22.

Refer now additionally to FIG. 5. After the placement of the batteries 30 in battery groups 30A and 30B, plastic spacer plates 60 and 62 are placed on top of battery groups 30A and 30B. Spacer plates 60 and 62 have locating features to locate spacer plates 60 and 62 on the batteries of battery groups 30A and 30B as well as locating features for the placement of the batteries 30 in battery groups 30C and 30D.

Figure 5A:
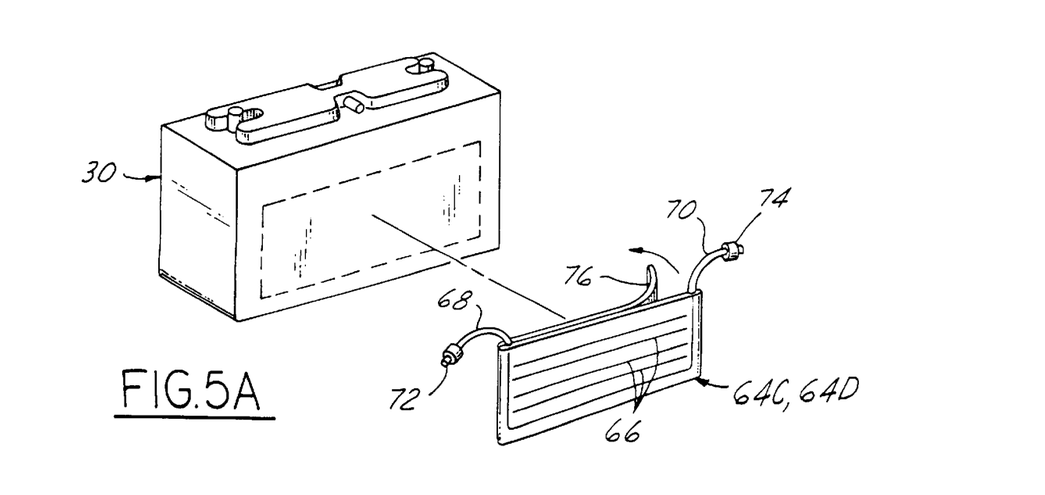
FIG. 5A shows an electric heater 64 being affixed to the side of a battery 30.

Attached to the side of each battery 30 of battery groups 30C and 30D is a heater 64C or 64D. Refer now additionally to FIG. 5A. Each heater 64C and 64D is comprised of parallel-connected heater traces 66 disposed on a flexible electrically-insulating substrate. The traces 66 terminate in wires 68 and 70 and connectors 72 and 74. A pressure-sensitive adhesive on heaters 64C and 64D is exposed when paper backing 76 is removed. Heater 64C or 64D is then affixed to the side of battery 30.

As illustrated in FIG. 5, all of the heaters 64C for the batteries 30 in group 30C are coupled in series. Likewise, all of the heaters 64D for the batteries 30 in group 30D are coupled in series.

Figure 6A:
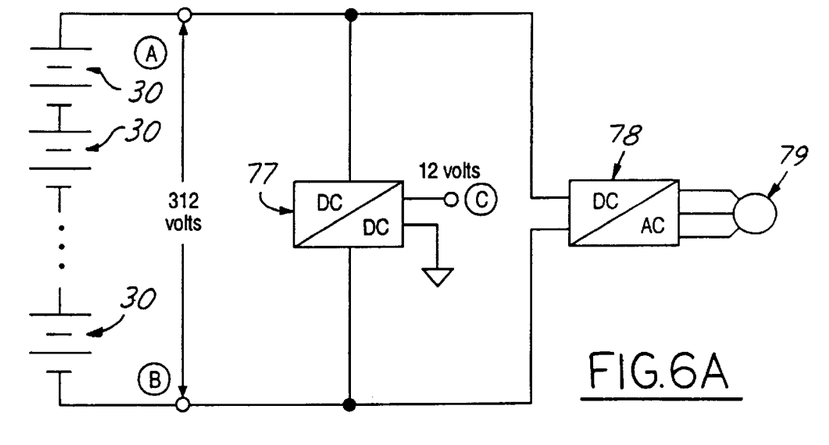
FIGS. 6A and 6B show electrical schematics of the heating system of this embodiment of the present invention.
Figure 6B:
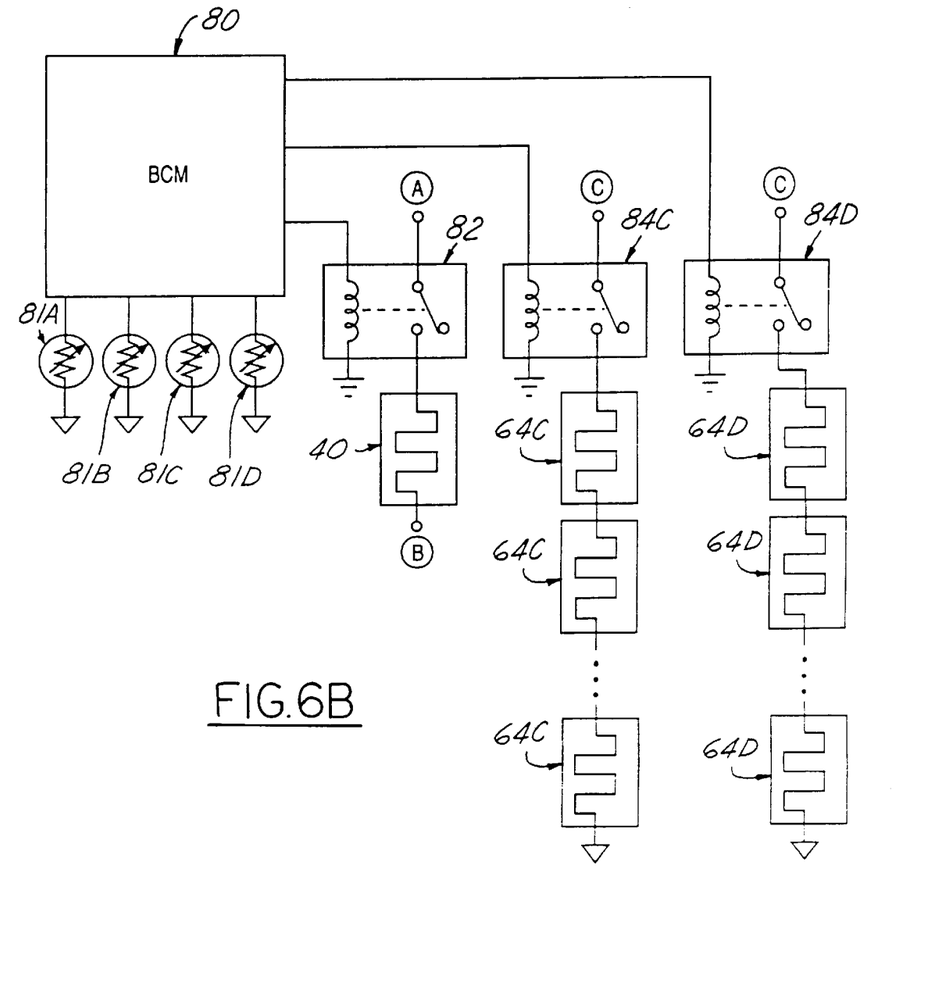

An electrical schematic of the heating system of this embodiment of the present invention is illustrated with reference to FIGS. 6A and 6B. Batteries 30 are coupled to a DC-to-DC converter 77 which is located outside battery carrier 22. DC-to-DC converter 77 converts the nominal 312 volts DC of the 39 lead-acid batteries 30 down to a nominal 12 volts DC. nominal 12 volts DC is used for powering most of the conventional electrical accessories of the vehicle (lamps, radio, etc.). The nominal 312 volts DC of the batteries 30 is also provided to inverter 78, which converts the 312 volts DC to three-phase AC for the induction motor 79 which propels vehicle 20 (FIG. 1).

Battery control module 80 is also provided, preferably within battery carrier 22. Battery control module 80 is a microprocessor-based device with appropriate microcomputer resources (throughput, memory, inputs, outputs and the like) to perform the functions ascribed to it herein. Battery control module 80 has as inputs four thermistors 81A, 81B, 81C and 81D. Thermistor 81A is located among the batteries 30 in battery group 30A. Likewise, thermistors 81B, 81C and 81D are located among the batteries 30 in battery groups 30B, 30C and 30D, respectively. Output devices controlled by battery control module 80 include relays 82, 84C and 84D. Relay 82 switchably couples heater 40 to the nominal 312 volts DC provided by batteries 30. Relay 84C switchably couples heaters 64C to the nominal 12 volts DC provided by DC-to-DC converter 77. Also, relay 84D switchably couples heaters 64D to the nominal 12 volts DC. (Note that it has been mentioned that DC-to-DC converter 77 is preferably outside battery carrier 22. The 12 volt DC output of DC-to-DC converter 77 is provided not only to the conventional electrical accessories on the vehicle, as noted above, but also back into battery carrier 22. This 12 volts DC provides power for heaters 64C and 64D as well as for battery control module 80.)

Battery control module 80 is responsible for controlling the energization of heaters 40, 64C and 64D in order to maintain an appropriate and evenly-distributed temperature in battery carrier 22. The algorithm performed by battery control module 80 is illustrated with additional reference to FIGS. 7A and 7B. At step 100, battery control module 80 determines whether the batteries 30 of vehicle 20 are presently being charged (that is, whether vehicle 20 is presently "ON PLUG"). Battery control module 80 can determine this information via a serial communication link (not shown) to the on-board battery charger carried by vehicle 20. If vehicle 20 is not presently ON PLUG, relays 82, 84C and 84D are all commanded off (step 102). All heaters 40, 64C and 64D are therefore OFF. Thus, the heaters 40, 64C and 64D only operate while batteries 30 are being charged, to avoid negative effects on the driving range of vehicle 20 due to the heaters taking power from batteries 30.

Figure 7A:
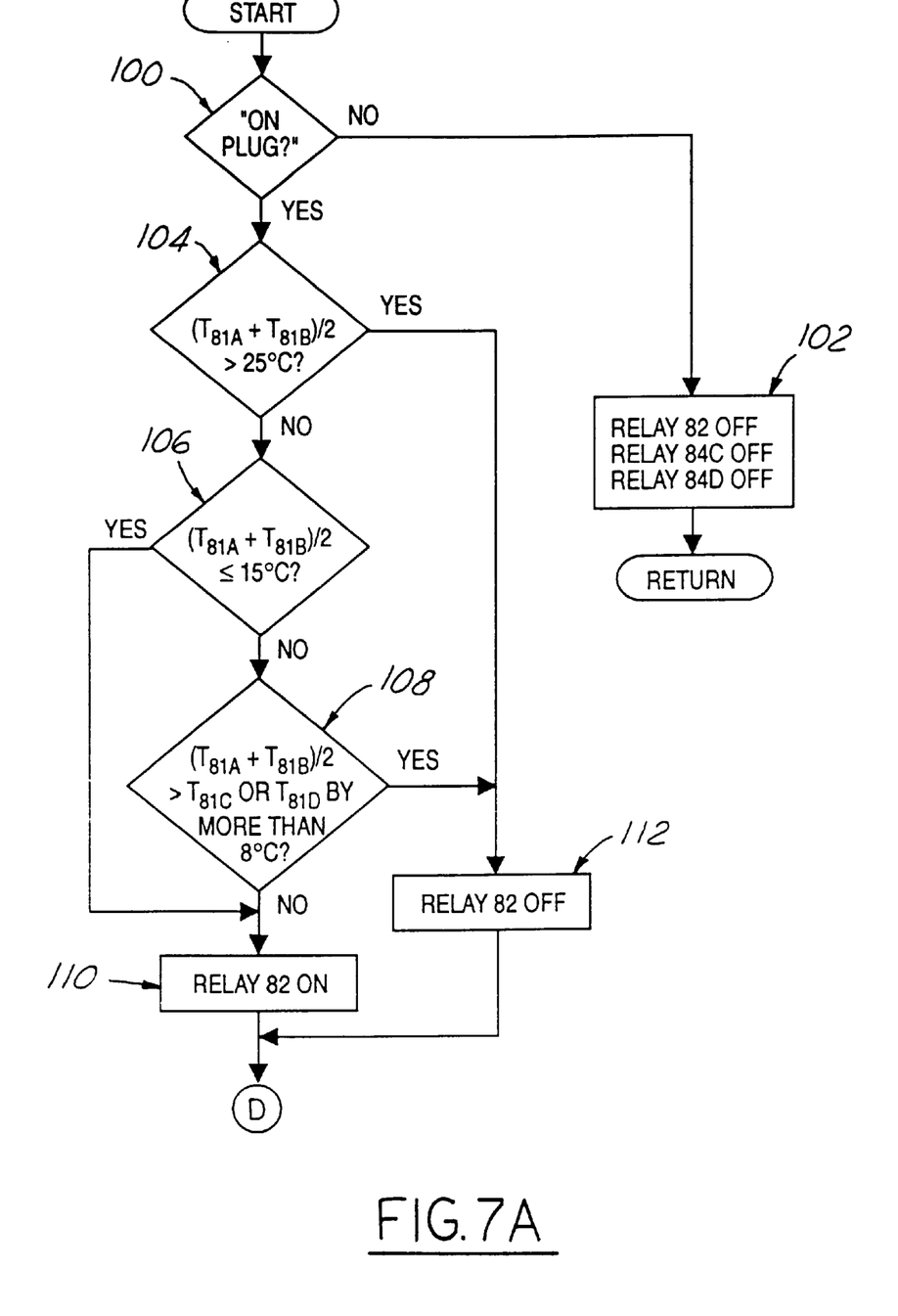
FIGS. 7A and 7B detail the algorithm performed by battery control module 80 of FIG. 6B in controlling the heaters within battery carrier 22.

If vehicle 20 is presently ON PLUG, it is determined at step 104 whether the average temperature of the thermistors 81A and 81B in battery groups 30A and 30B, the two battery groups on the bottom of battery carrier 20, is above 25° C. If YES, heater 40 need not be on, so relay 82 is turned OFF (step 112). If NO, it is determined at step 106 whether the average temperature of thermistors 81A and 81B in battery groups 30A and 30B is less than or equal to 15° C. If YES, heater 40 should definitely be ON, so relay 82 is turned ON at step 110. If NO, the algorithm progresses to step 108.

At step 108, it is determined whether the average temperature of thermistors 81A and 81B is greater than the temperature of thermistor 81C or 81D, the thermistors in battery groups 30C and 30D, by more than 8° C. If YES, too great a disparity in temperatures within battery carrier 22 is occurring, so relay 82 is turned OFF to turn heater 40 OFF (step 112). If NO, there is no excessive disparity and relay 82 is turned ON to turn heater 40 ON (step 110).

Figure 7B:
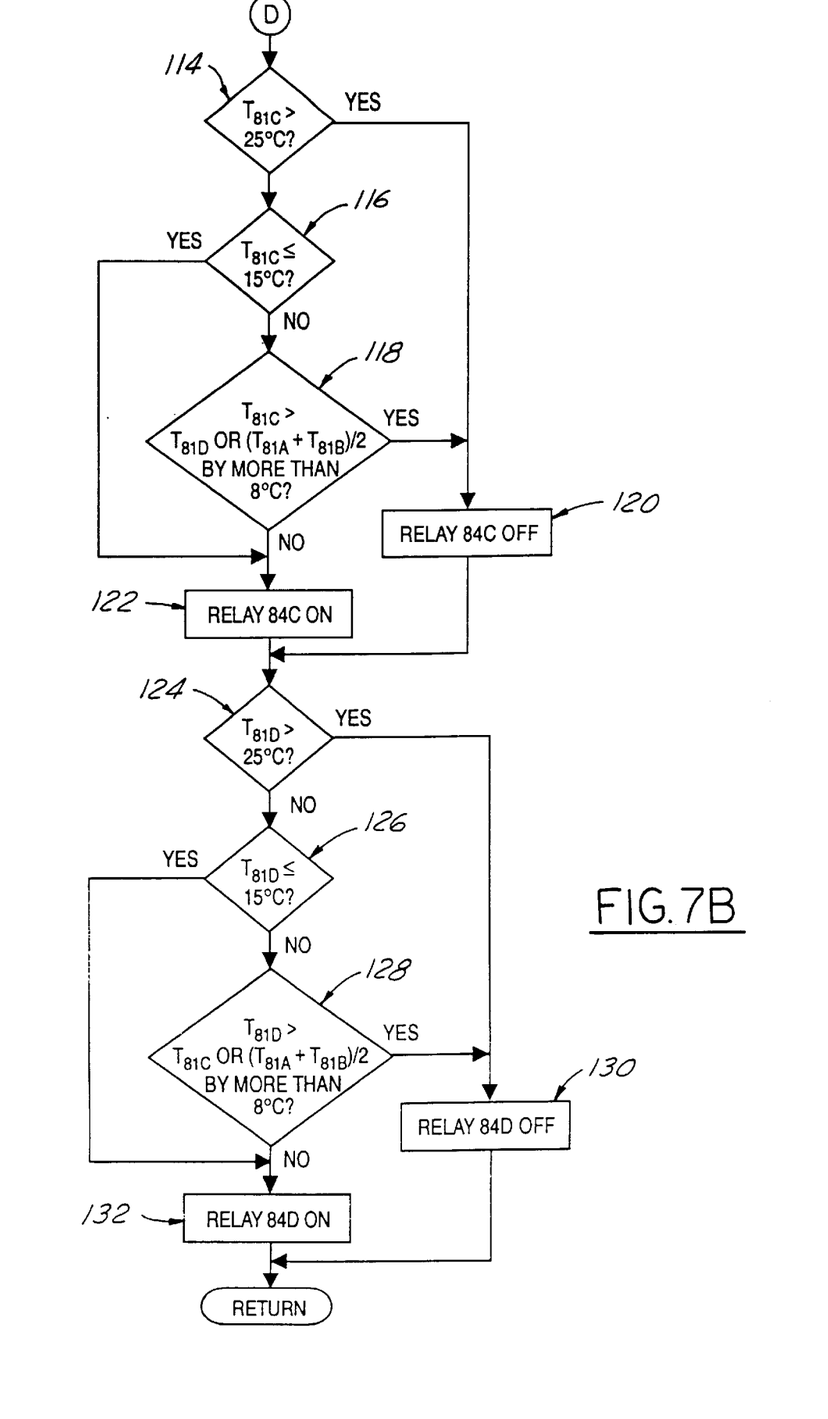

The algorithm then progresses to step 114. At step 114, it is determined whether the temperature of thermistor 81C, located in battery group 30C, is greater than 25° C. If YES, heaters 64C need not be on, so relay 84C is turned OFF at step 120. If NO, it is determined at step 116 whether the temperature of thermistor 81C is less than or equal to 15° C. If YES, heaters 64C should definitely be ON, so relay 84C is turned ON at step 122. If NO, the algorithm progresses to step 118.

At step 118, it is determined whether the temperature of thermistor 81C is greater than either the temperature of thermistor 81D or the average of the temperatures of thermistors 81A and 81B by more than 8° C. If YES, battery control module 80 concludes that too great a disparity in temperature is occurring between the batteries in group 30C and the batteries 30 in at least some of the other groups. Relay 84C is thus turned OFF at step 120 in order to turn OFF heaters 64C. If the result at step 118 is NO, no such excessive disparity exists, so heaters 64C can be ON. Relay 84C is thus turned ON at step 122. The algorithm then progresses to step 124.

At steps 124–132, relay 84D (which controls power to heaters 64D) is controlled in the same manner as relay 84C, which was just described. That is, if thermistor 81D, located in battery group 30D, indicates a temperature of less than 15° C. or a temperature between 15° C. and 25° C. with no disparity of greater than 8° C. between thermistor 81D and the other thermistors, relay 84D is commanded ON. Otherwise, relay 84D is commanded OFF.

Through the heater configuration and control algorithm described herein, the temperatures of batteries 30 are kept within reasonable limits and reasonably uniform. This result is accomplished without the requirement of many high-voltage connections to the various heaters. As is seen in FIG. 6B, only one heater, heater 40, is coupled to high voltage, and this is done via a single high-voltage connector. The desirable battery heating result is further accomplished without undue drain on the relatively scarce energy provided by DC-to-DC converter 77, as some heating is provided from the high-voltage portion of the system. Additionally, the desirable battery heating result is accomplished without the need for a air-circulation system to circulate the air within battery carrier 22 to maintain temperature uniformity, despite the tendency toward temperature stratification caused by the nonuniform geometry and potentially nonuniform heat loss characteristics of battery carrier 22.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A heating system for a plurality of vehicle batteries, said system comprising:

a series-connected plurality of vehicle batteries;

a plurality of electric heaters apportioned into at least a first group containing at least one electric heater and a second group containing at least one electric heater, each electric heater of said plurality of electric heaters in thermal communication with at least one of said vehicle batteries;

a voltage downconverter having an input coupled across series-connected plurality of vehicle batteries and having an output;

the first group of electric heaters coupled to receive electric power at the series voltage of said series-connected plurality of vehicle batteries;

the second group of electric heaters coupled to receive electric power from said output of said voltage downconverter.

2. A heating system as recited in claim 1, wherein:

each heater in said first group is coupled to a side of one or more of said vehicle batteries;

each heater in said second group is located below more than one of said plurality of series-connected vehicle batteries.

3. A heating system as recited in claim 2, wherein:

said plurality of series-connected vehicle batteries are arranged in a plurality of tiers having at least a first tier and a second tier, said second tier located beneath said first tier;

said heaters in said first group are coupled to batteries in said first tier; and said heaters in said second group are located beneath batteries in said second tier.

4. A heating system as recited in claim 3, wherein said heaters in said first group are independently controllable from said heaters in said second group.

* * * * *